United States Patent [19]
Stevens

[11] Patent Number: 5,942,698
[45] Date of Patent: Aug. 24, 1999

[54] DETECTING AND MEASURING LIQUID FLOW IN REMOTE SEWER STRUCTURES

[75] Inventor: Patrick L. Stevens, Indianapolis, Ind.

[73] Assignee: ADS Environmental Services, Inc., Huntsville, Ala.

[21] Appl. No.: 08/974,363

[22] Filed: Nov. 19, 1997

[51] Int. Cl.⁶ ................................................ G01N 1/00
[52] U.S. Cl. ................ 73/863.03; 340/616; 340/606
[58] Field of Search .................. 73/863.03; 340/540, 340/606, 612

[56] References Cited

U.S. PATENT DOCUMENTS

| | | | |
|---|---|---|---|
| 3,703,715 | 11/1972 | McNally | 340/240 |
| 3,978,462 | 8/1976 | Goodman | 340/243 |
| 4,392,128 | 7/1983 | Young et al. | 340/616 |
| 4,546,346 | 10/1985 | Wave et al. | 340/608 |
| 4,922,234 | 5/1990 | Murphy | 340/608 |
| 4,961,068 | 10/1990 | Hendricksen | 340/616 |
| 5,006,833 | 4/1991 | Marlowe et al. | 340/611 |
| 5,053,751 | 10/1991 | Gould | 340/623 |

OTHER PUBLICATIONS

"A Guide to Short Term Flow Surveys of Sewer Systems", published by the Water Research Centre, Wiltshire, England, Chapter 4.

*Primary Examiner*—George Dombroske
*Assistant Examiner*—Jewel V. Thompson
*Attorney, Agent, or Firm*—Baker & Botts, LLP

[57] ABSTRACT

In the particular embodiments described in the specification, a virtual sewer flow monitor detects flow rate and depth information periodically and supplies it to a scattergraph generator and a polynomial curve generator produces a polynomial curve corresponding to the scattergraph data. A filter eliminates polynomial curve portions corresponding to normal sewer flow conditions and an SSO detector responds to curve portions indicating a sewer overflow condition to generate an alarm.

9 Claims, 4 Drawing Sheets

DETECTING AND MEASURING LIQUID FLOW IN REMOTE SEWER STRUCTURES

BACKGROUND OF INVENTION

This invention relates to the detection and measurement of flow characteristics of liquid flowing in a sewer pipe at a location remote from a flow detector.

The occurrence of a sanitary sewer overflow (SSO) during a rain storm has long plagued sewer systems. Such SSOs can occur through manholes or other structures connected to the sewer system. At present SSOs are largely unmeasured and unreported but the Environmental Protection Agency is developing programs which will require reporting and controlling SSOs. Traditionally, the approach to quantifying such overflows is to install two measuring devices, one above and the other below a potential site so that the volume of an overflow can be determined by subtraction. A preferred approach is to provide a single measuring device in a sewer overflow pipe but many overflows occur from manholes as gushers or in locations where the installation of an overflow monitor is not feasible.

During the last century, hydraulic engineers have developed equations called pipe curves which describe the relationship between the depth of an open channel and the velocity of gravity flow. For a given depth of flow, there is a unique and predictable flow velocity (and flow rate) of liquid in the channel which can be determined from a standard pipe curve such as one described by Robert Manning in 1890. Another standard pipe curve is called the Colebrook-White pipe curve.

Under normal conditions, a plot of a collection of paired depth and velocity readings taken periodically over a time interval during which the depth and velocity vary, called a "scattergraph", should produce a pattern similar to that of a standard pipe curve. Flow patterns that deviate from a standard pipe curve tend to indicate either that the flow meter is malfunctioning or that the hydraulics of the pipe are not normal. Heretofore, it has not been possible to analyze automatically a scattergraph of sewer flow data which deviates from the standard pipe curve under abnormal flow conditions to establish the existence and possible cause of the abnormality. While scattergraph analysis has been attempted previously, visual examination of each scattergraph has been required. One published scattergraph analysis technique is "A Guide to Short Term Flow Surveys of Sewer Systems", published by the Water Research Centre, in Wiltshire, England. According to that publication, information regarding abnormal flow conditions is obtained by observation of the spread and shape of the data points in a scattergraph.

SUMMARY OF THE INVENTION

Accordingly, it is an object of the present invention to provide a method for analyzing liquid flow in a sewer which overcomes disadvantages of the prior art.

Another object of the invention is to provide a method for analyzing sewer flow data automatically to detect and indicate causes of abnormalities in the sewer flow.

These and other objects of the invention are attained by producing scattergraph data representing instantaneous liquid flow rate versus liquid depth in a sewer over a period of time, creating a polynomial curve representing the scattergraph data, determining deviations from a standard pipe curve and detecting automatically from the deviations from the standard pipe curve abnormal flow conditions in the sewer. In this way, a virtual flow monitor is provided to indicate abnormal conditions at locations remote from the location of the flow detector.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
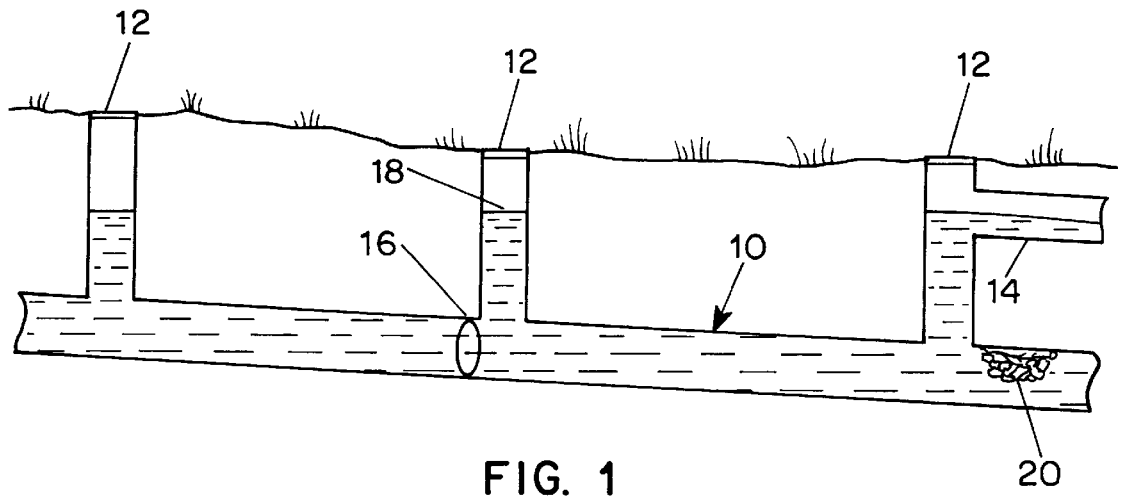
FIG. 1 is a schematic illustration showing water flow in a sewer containing an obstruction during an overflow condition.

In the typical sewer system illustrated in FIG. 1, a sewer pipe 10 having a series of manhole access points 12 is provided with an overflow conduit 14 intended to divert excess water when the sewer is subjected to flow rates beyond its normal maximum capacity. As designed, the sewer system is intended to handle all, even extreme, flow conditions utilizing the overflow 14 except in extreme events, without permitting any water to emerge from the manholes 12 or the overflows 14. In order to monitor the sewer flow, a conventional sewer flow meter 16 periodically measures the velocity of the water flowing through the sewer and the depth of the water in the sewer system, the depth being determined, for example, by a pressure detector or by ultrasonic detection of the level 18 of the surface of the water in the sewer.

One potential cause of sewer overflow may be the existence of a bottleneck 20 in the sewer resulting, for example, from tree roots or from accumulation of solid debris which is not carried away by the flowing water in the sewer. The result of such blockage is to cause the water to rise in the region upstream of the blockage so that it will be diverted through the overflow 14 during an SSO or, in extreme cases, will emerge from the manholes 12 in the region upstream of the blockage.

Figure 2:
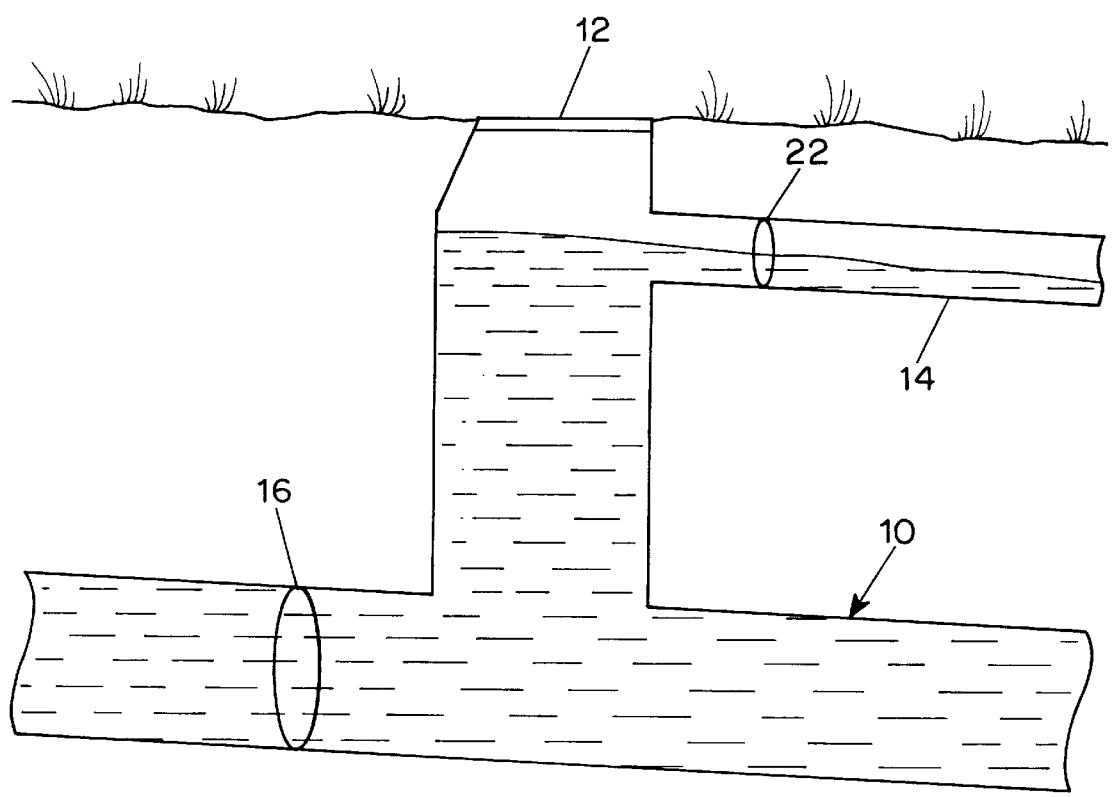
FIG. 2 is a schematic illustration showing a conventional arrangement for detecting an overflow condition in a sewer.

In order to detect the existence of such SSO conditions, it has heretofore been necessary to obtain information from flow meters 16 located both upstream and downstream of the obstruction and detect the difference in flow rates or else to provide a separate flow meter in the overflow pipe 14. The latter arrangement is shown in FIG. 2 in which an overflow meter 22 is disposed in the overflow pipe 14, thereby permitting direct detection of overflow conditions and the velocity and volume of the overflow. Not all manholes are provided with overflows, however, and, in addition, an overflow meter will not detect water which has emerged from the top of the manhole. Moreover, the added cost of installing a flow meter in every overflow pipe, when some overflow pipes are used only rarely, may not be justifiable.

Figure 3:
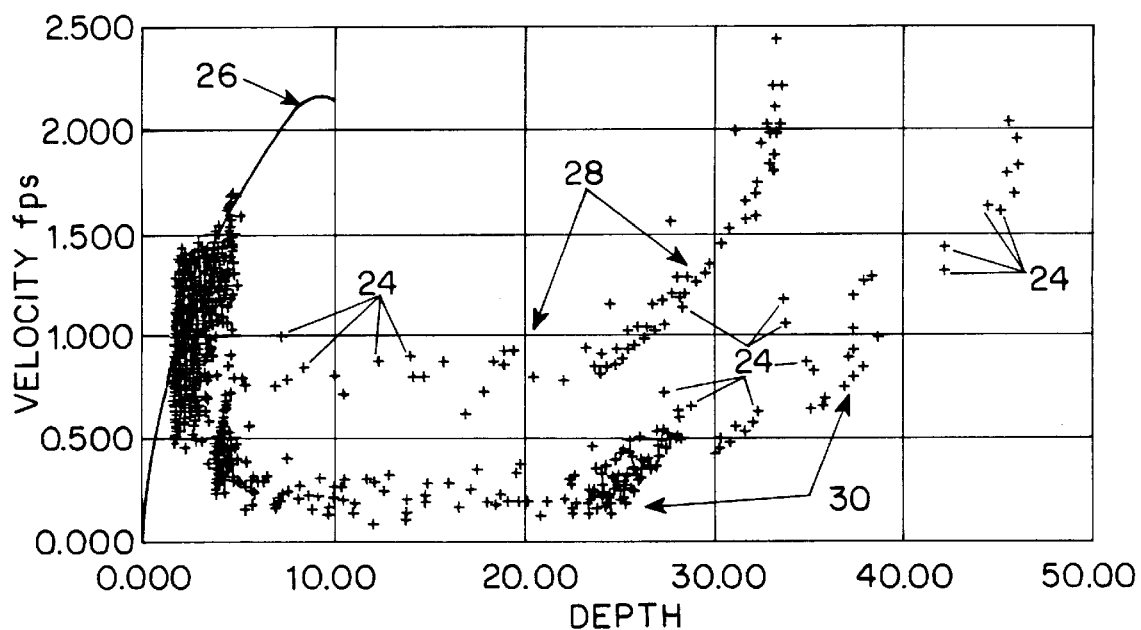
FIG. 3 is a scattergraph illustrating velocity versus depth data generated during two sewer overflow events.

In accordance with the invention, therefore, a virtual flow monitor arrangement is provided in which data from single flow meter are processed in such a way as to detect and indicate abnormal flow conditions such as SSOs downstream of the meter. For this purpose, the liquid depths and corresponding velocity values determined periodically by a conventional flow meter 16 of the type shown in FIG. 1 are plotted in a scattergraph as shown in FIG. 3. In this graph, each point 24 corresponds to one simultaneous measurement pair representing the flow depth and velocity at a particular time. In addition, a curve 26 represents the pipe curve for the particular sewer pipe in which the measurements are being taken. Under ideal conditions, all of the data points 24 should be distributed along or near the pipe curve 26. As shown in FIG. 3, however, many of the data points 24 are scattered and indicate lower velocities at greater depths than those along the pipe curve 26. These data points show that the liquid velocity was reduced from expected values at the greater depth values. In one region 28 the data points show a velocity of about one foot per second up to a depth of about 24 inches after which the velocity increased while the depth remained about the same. In another region 30 the velocity remained below 0.5 feet per second up to about 24 inches depth and then increased gradually with depth up to about 45 inches.

To a trained scattergraph analyst, the regions 28 and 30 indicate two different SSOs resulting from flow blockage conditions downstream of the flow meter. In order to detect such blockage conditions, however, visual examination and analysis of scattergraph data of the type shown in FIG. 3 has been necessary. Such visual examination requires extensive man power and often takes place long after the events involved have occurred, thereby preventing timely corrective action.

To overcome these problems, the present invention provides a virtual flow-monitor which automatically and continuously converts the scattergraph information into a polynomial curve and analyzes the polynomial curve. While a human can be trained to recognize patterns and shapes, a computer must have mathematical expressions from which comparisons can be made. For this purpose, the virtual flow monitor, after converting the scattergraph data into one or more polynomial curves, automatically identifies the characteristics of the pipe curve that indicates downstream abnormalities and SSO occurrences, in the regions 28 and 30 of FIG. 3, for example, for automatic analysis of downstream flow conditions.

Figure 4:
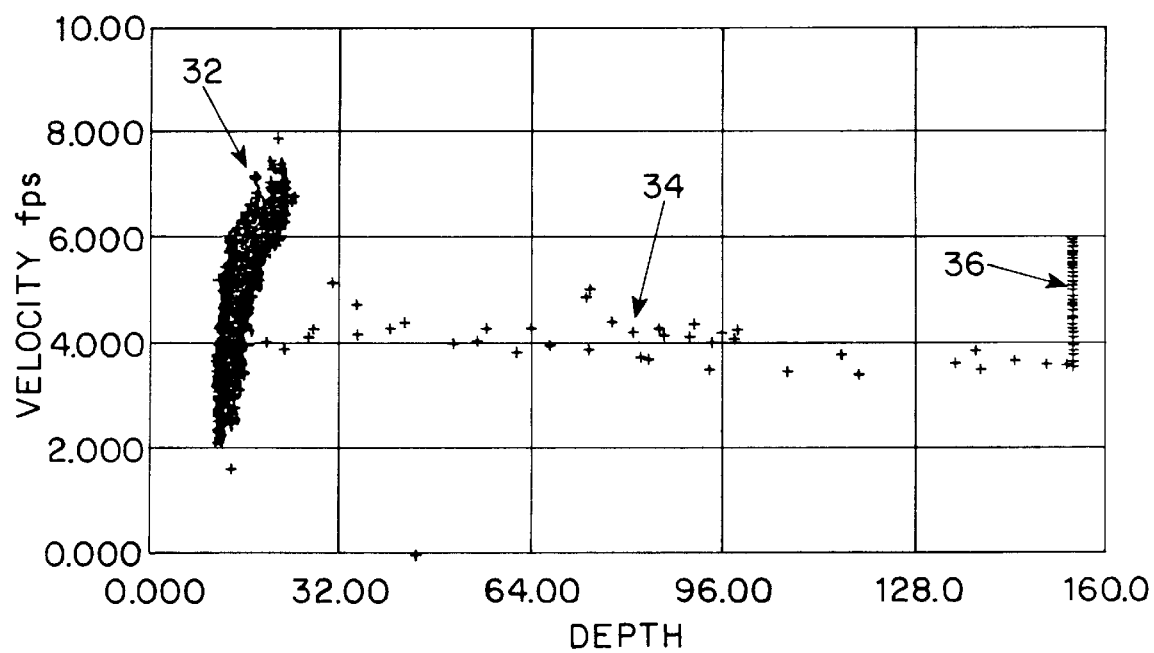
FIG. 4 is a scattergraph illustrating sewer flow data showing an abnormal flow condition.

In an example shown in FIG. 4, a scattergraph data pattern 32 at the left side of the graph represent the normal flow condition and a second scattergraph pattern 34 extends across the graph from the region 32 to the right side of the graph, showing a fairly constant flow velocity of about five feet per second up to a depth of about 150 inches. At the right side of the graph, another scattergraph pattern 36 indicates flow velocities ranging from 4 to 6 feet per second at about 150 inches depth, which indicate an SSO resulting from a downstream blockage. While such visual analysis of scattergraph patterns is possible, there has been no automatic detection and analysis of such scattergraph data.

Figure 5:
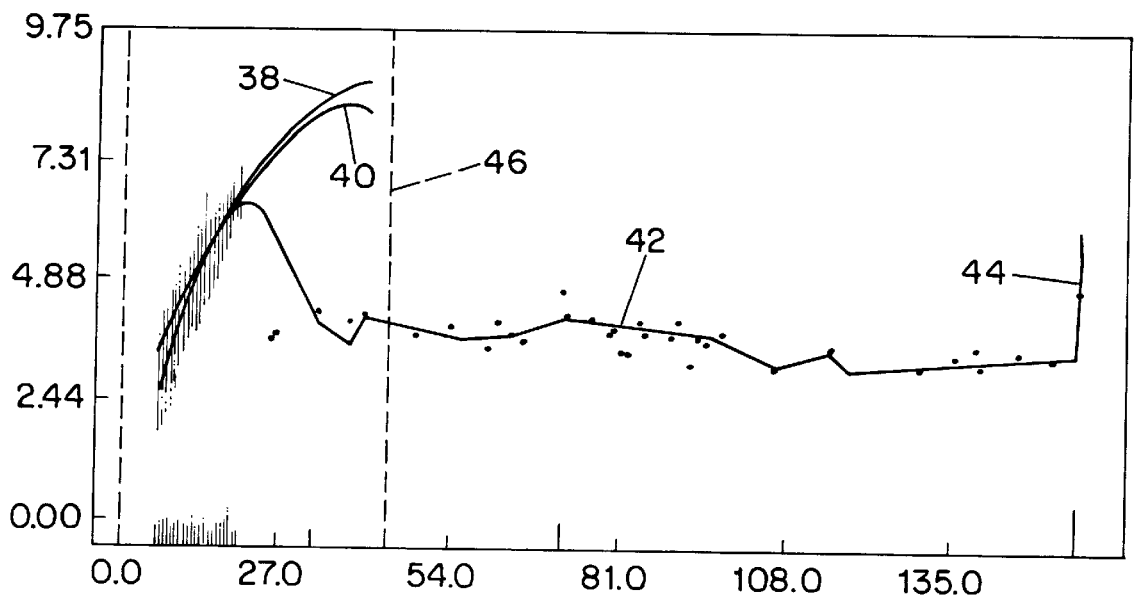
FIG. 5 is a scattergraph similar to FIG. 4 in which polynomial curves have been generated for the scattergraph data.

In accordance with the invention, however, scattergraph data such as the typical data represented in FIG. 4 are processed to produce polynomial curves such as shown in FIG. 5 in which the vertical dash line 46 represents the diameter of the sewer pipe. In this case, two curves designated 38 and 40 in FIG. 5 correspond to two standard pipe curves i.e., the Manning pipe curve 38 and the Colebrook-White pipe curve 40, both indicating normal flow conditions in the pipe. A further curve 42 represents the scattergraph data in the region 34 of FIG. 4 and a vertical line 44 represents the data in the region 36 of FIG. 4, both corresponding to abnormal flow conditions. The vertical data line 44 in FIG. 5 which shows increasing velocity at a fixed depth, indicating a downstream overflow condition, is readily detectable by software in contrast to the scattergraph pattern of FIG. 4. Similar polynomial curves can be generated to show the overflow conditions corresponding to the regions 28 and 30 in the scattergraph of FIG. 3.

Thus, by generating a polynomial curve from scattergraph data, it is possible for the virtual monitor to analyze sewer pipe flow conditions using a single meter and to detect and measure downstream storm sewer overflows so as to permit rapid detection and correction of the condition leading to the overflows.

Figure 6:
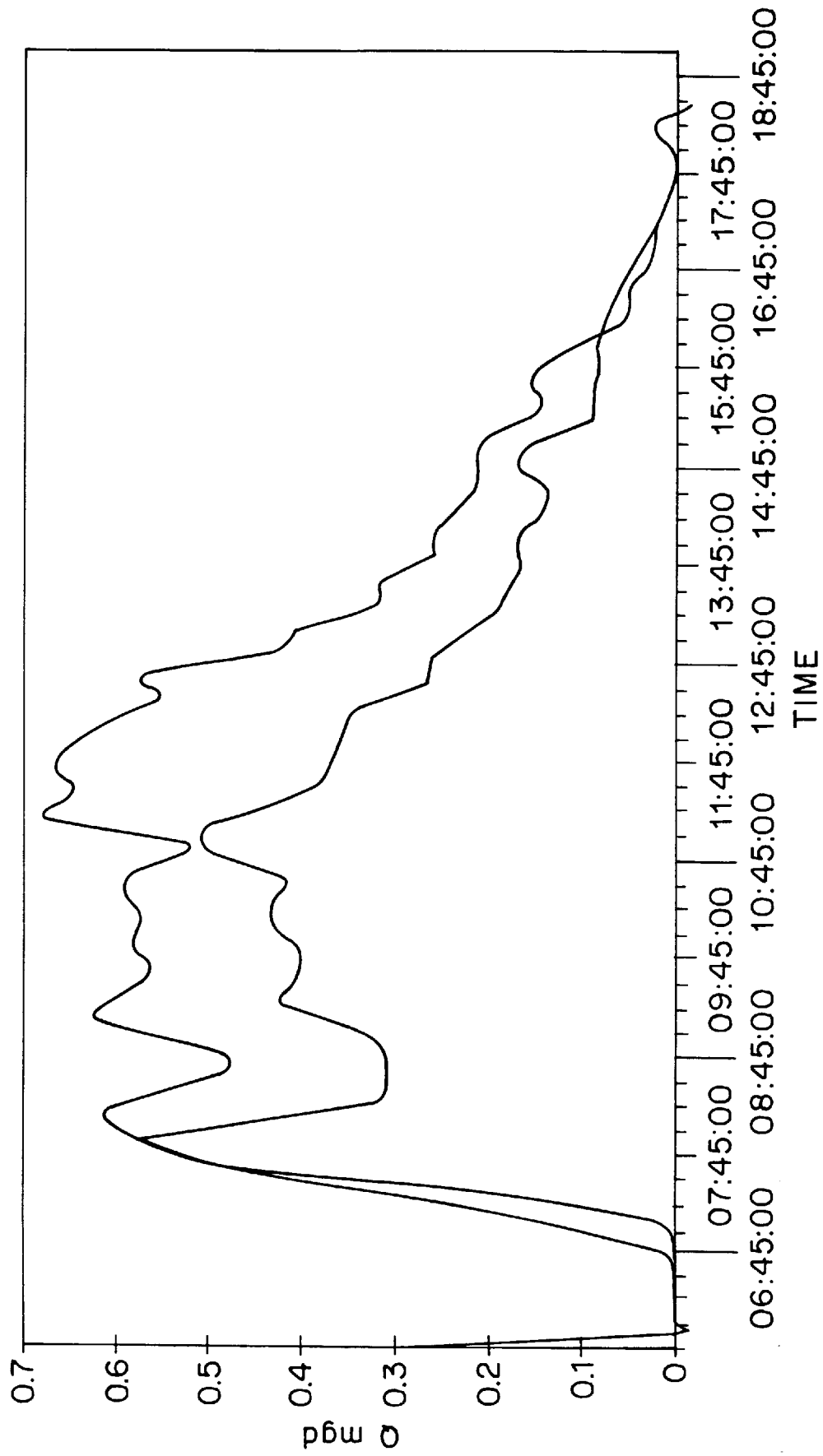
FIG. 6 is a graphical representation showing variations in sewer overflow rate with time as determined by a conventional overflow meter and by a virtual monitor according to the present invention.

FIG. 6 illustrates a comparison between a hydrograph curve 48 showing variations in the volume rate of overflow with time as detected by a virtual monitor in accordance with the invention and a curve 50 representing the actual volume rate of overflow as detected by an overflow meter 22 in an overflow pipe 14 such as shown in FIG. 2. While the specific flow rate and volume values differ somewhat, the similarity of the variations with time in the overflow curve pattern for the virtual monitor to that produced by the overflow meter 22 demonstrates the usefulness of overflow detection with the virtual monitor system.

Figure 7:
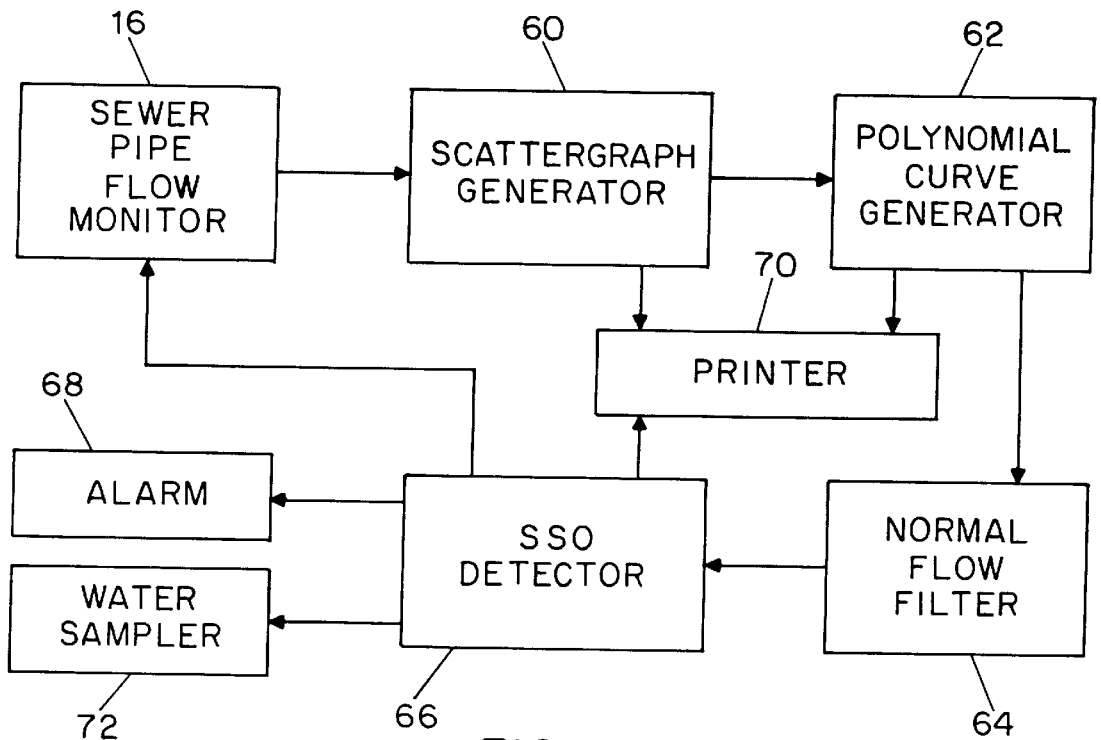
FIG. 7 is a schematic block diagram showing the arrangement of a representative embodiment of a virtual flow monitor in accordance with the invention.

A representative embodiment of a virtual monitor arrangement for carrying out the invention is illustrated schematically in FIG. 7. In this embodiment, a conventional sewer pipe flow meter 16 of the type shown in FIG. 1 transmits depth and flow velocity data pairs at periodic intervals to a scattergraph generator 60 which generates a scattergraph of the type shown in FIGS. 3 and 4 based on data received from the flow meter 16 over a period of time. At selected time intervals, such as every week or month, depending upon sewer flow conditions, or after each rainstorm, the scattergraph data produced by the generator 60 is transmitted to a polynomial curve generator 62 which produces one or more polynomial curves to fit the scattergraph in a conventional manner, for example, by a least squares fit. As a result curves such as the curve segments 38, 40, 42 and 44 shown in FIG. 5, are generated to fit the scattergraph data in various regions of the scattergraph shown in FIG. 4. In the generation of the polynomial curve segments 38, 40, 42 and 44, the polynomial curve generator is preferably designed to recognize and compensate for presumably erroneous data points, i.e. those which deviate from the curve being generated by more than a selected amount, for example, 20%, of the value indicated by the curve at the location of the point.

The curve information generated by the polynomial curve generator 62 is transmitted to a normal flow filter 64 in which curve segments corresponding to normal flow conditions such as the curves 38 and 40 of FIG. 5 are filtered out and the remainder of the curve information is transmitted to an abnormal flow event detector such as an SSO detector 66. The SSO detector 66 is arranged to detect automatically a generally vertical line segment such as the line 44 in FIG. 5, indicating increasing flow rates at a depth greater than the diameter 46 of the sewer pipe. Upon detection of an SSO event, the system actuates an alarm 68 at a control station which can be both visual and audible. In addition, the system preferably includes a printer 70 which, upon activation of the alarm, prints a copy of the scattergraph generated by the generator 60 and of the polynomial curve generated by the generator 62 for visual observation by an operator of the system. The SSO detector may also initiate other steps such as activating a water quality sampler 72 or changing the rate of data generation by the flow monitor 16 or sending a message to the printer 70, or to a remote printer to generate records documenting the start, duration, and volume of the overflow. Upon detection of an SSO, the system can also generate a time series hydrograph which can be used by engineers and operators in dealing with the detected condition.

Although the invention has been described herein with reference to specific embodiments, many modifications and variations therein will readily occur to those skilled in the art. Accordingly, all such variations and modifications are included within the intended scope of the invention.

I claim:

1. A method for monitoring flow conditions in a sewer comprising detecting periodically the flow rate and water level at a selected location in the sewer;

generating a scattergraph of the flow rate and water level data detected over a period of time;

generating at least one polynomial curve based on the scattergraph data;

automatically detecting an abnormal flow condition from the polynomial curve; and initiating action upon detection of an abnormal flow condition.

2. A method according to claim 1 wherein the action initiated upon detection of an abnormal flow condition is generation of an alarm.

3. A method according to claim 1 wherein the action initiated upon detection of an abnormal flow condition is activation of a water sampler.

4. A method according to claim 1 including the step of filtering regions representing normal flow conditions in the sewer pipe from the polynomial curve.

5. An arrangement for monitoring sewer flow conditions automatically comprising:

a sewer pipe flow monitor for generating liquid depth versus flow rate data periodically;

a scattergraph generator for generating a scattergraph from data produced by the sewer pipe flow monitor;

a polynomial curve generator for generating a polynomial curve based on data in the scattergraph produced by the scattergraph generator;

a detector for detecting an abnormal flow condition based on the configuration of the polynomial curve produced by the polynomial curve generator; and means for initiating further action based on the operation of the detector.

6. An arrangement according to claim 5 wherein the means for initiating further action generates an alarm.

7. An arrangement according to claim 5 wherein the means for initiating further action activates a water sampler.

8. An arrangement according to claim 5 including a filter for filtering polynomial curve portions corresponding to normal sewer flow operation.

9. An arrangement according to claim 5 including a printer for printing at least one of a scattergraph generated by the scattergraph generator and a polynomial curve generated by the polynomial curve generator.

* * * * *